United States Patent Office 3,532,503
Patented Oct. 6, 1970

3,532,503
METHOD OF MANUFACTURING FEED BLOCKS
Boris Kviesitis, Des Moines, Iowa, assignor to Vy Lactos Laboratories, Inc., Des Moines, Iowa, a corporation of Iowa
No Drawing. Filed Sept. 9, 1966, Ser. No. 578,146
Int. Cl. A23k 1/02
U.S. Cl. 99—6          8 Claims

ABSTRACT OF THE DISCLOSURE

A method of making an animal feed block wherein molasses is mixed with a non-absorbent carrier material and dried. A surface active emulsion is mixed with the dried material and the mixture is then steamed and pressed into blocks.

---

This invention relates to a method of manufacturing feed blocks of controlled density or hardness.

Feed blocks are commonly used for the feeding of animals such as cattle, horses, sheep, hogs, poultry and dogs. The most common feed blocks used in cattle feeding are salt, mineral, protein and molasses. A typical formula for a 38% protein supplement feed block is found in Feed Trade Manual, National Provisioner, Inc. (1961), and is reproduced in Table A below.

TABLE A

| Ingredient | Pounds | Percent by wt. |
|---|---|---|
| Soybean meal | 600 | 33.0 |
| Cottonseed meal | 200 | 10.0 |
| Linseed meal | 100 | 5.0 |
| Corn gluten feed | 200 | 10.0 |
| Wheat middlings | 200 | 10.0 |
| Cane molasses | 100 | 5.0 |
| Alfalfa meal (dehydrated) | 100 | 5.0 |
| Urea | 100 | 5.0 |
| Calcium carbonate | 50 | 2.5 |
| Phosphate | 40 | 2.0 |
| Trace mineral salt | 40 | 2.0 |
| Salt (plain) | 200 | 10.0 |
| Total | 2,000 | 100.0 |

A typical formula for a mineral feed block is also found in the Feed Trade Manual, supra, and is reproduced in Table B below.

TABLE B

| Ingredient | Pounds | Percent by wt. |
|---|---|---|
| Calcium carbonate | 400 | 20.0 |
| Calcium phosphate | 1,000 | 50.0 |
| Salt | 400 | 20.0 |
| Trace minerals | 50 | 2.5 |
| Binder | 50 | 2.5 |
| Cane molasses | 100 | 5.0 |
| Total | 2,000 | 100.0 |

Tables A and B illustrate two of the many possible variations of the feed block formulations. The feed blocks are fed to the animals ad libitum. Obviously, it is desirable that the animals consume the feed blocks in amounts which are nutritionally and economically justified. Attempts have been made previously to control the consumption of the feed blocks by regulating the palatability of the blocks.

It was found that the feed block consumption could be increased if the palatability thereof was increased. Cane molasses is considered to be a highly palatable feed ingredient. The consumption of liquid cane molasses fed ad libitum is in a range of 4.0 to 11.7 pounds per head per day according to the Sugar Journal, September 1964, pp. 17 and 30. The consumption of the protein feed blocks is in a range of 0.5 to 0.75 pound per head per day according to Feed Stuffs, Apr. 17, 1965. It is generally accepted that the consumption of the salt (NaCl) is 1.2 to 1.5 ounces per head per day.

The nutritional requirement of cows is one ounce of salt per head per day in addition to that found in natural feeds. Loose salt fed ad libitum to farm stock undoubtedly results in the animals consuming an excess of salt. The consumption of salt in the form of soft salt blocks by animals is approximately the same as the consumption of loose salt, that is, consumption excess of the normal requirement. However, an increase of the hardness of the salt blocks will reduce the consumption thereof to approximately one-half ounce or less per day depending on the degree of hardness.

Some attempts have been made to control the consumption of the feed blocks by adding salt thereto. However, the presence of other feed constituents can and does adversely affect the consumption regardless of the salt concentration in the formulation. For example, the presence of cane molasses can increase the consumption several times while the presence of unpalatable constituents such as dicalcium phosphate or certain drugs can reduce the consumption to a very low level. Therefore, the only effective way to control the consumption of the feed blocks is to control the hardness thereof.

Possible methods of controlling the hardness of the feed blocks are as follows:

(1) Adjusting the pressure of the feed block machine;
(2) Adjusting the holding time of the applied pressure of the block machine;
(3) Addition of water to the mixture; and
(4) Addition of binding agents.

In a majority of cases, it would be necessary to combine several of the above methods in an attempt to obtain a feed block of the desired hardness. However, there are some limitations in altering the operation of the block machine and in the addition of water or binding agents. The designs of the block machines do not permit adjustments (1) and (2) above without affecting the performance of the operation. The addition of water to the mixture of the feed block constituents creates several problems. The high interfacial tension of some of the ingredients causes the formation of lumps upon the addition of water. Conventional mixing machines cannot disperse these sticky lumps. The same problems exist when an excess of binding agents are added.

Therefore, it is a principal object of this invention to provide a method of making a feed block.

A further principal object of this invention is to provide a method of making a feed block which improves the block production process by regulating the binding properties of the feed mixtures.

A further object of this invention is to provide a method of making a feed block which prevents the feed mixtures from becoming lumpy or sticky.

A further object of this invention is to provide a method of making a feed block which is especially well adapted for feed blocks having a high concentration of cane molasses.

A further object of this invention is to provide a method of making a feed block which permits the consumption thereof to be controlled by varying the hardness.

A further object of this invention is to provide a method of making a feed block which has the desired physical properties such as surface and penetration hardness, crush strength and weatherability.

A further object of this invention is to provide a method of making a feed block which has the required nutritional values.

A further object of this invention is to provide a method of making a feed block which has desirable organoleptic properties.

This invention not only relates to a method of manufacturing feed blocks of controlled density or hardness but also relates to the method of treating and processing feed ingredients such as cane molasses, beet molasses, citrus molasses, corn molasses (hydrol), wood molasses, soybean meal, corn germ meal, soybean hulls, corn gluten meal, corn gluten feed, corn cobs, rice hulls, oat hulls, alfalfa, flax byproducts, phosphate minerals, sodium chloride (salt), calcium carbonate, trace minerals and the like, and more particularly to the feed blocks prepared from such materials. Several factors are considered in the manufacture of feed blocks. One of the factors to be considered is the nutritional composition of the feed blocks which should be in accordance with accepted feeding practice. A second factor to be considered is the physical properties of the blocks, such as surface and penetration hardness, crush strength and weatherability. The third factor to be considered is the organoleptic properties of the feed blocks with regard to their palatability. Cane molasses in liquid or in dry form is a versatile feed ingredient which is widely used in various feed formulations. The nutritional value of cane molasses is very high due to the high content of readily available carbohydrates (sugars), organic acids, trace minerals and flavoring compounds. The organoleptic properties of the cane molasses, due to the sweetness of the sugars combined with an attractive aroma, make it a choice ingredient for improving the palatability of a feed. Additionally, the adhesive nature of cane molasses, due to the presence of gums, make it an excellent binder for making pellets or feed blocks. However, there are some technical limitations to the use of molasses at a high concentration. The limiting factor in the case of liquid molasses is the high moisture content thereof which may amount to approximately 28 to 30% in feed grade cane molasses and may reach 15 to 20% in industrial cane molasses. The high moisture content of a feed is undesirable in many cases. For example, feed or range blocks made of a wet mixture are too soft for handling or feeding. Dried cane molasses products may be used for manufacturing dry feed in meal form at almost any level. However when these products are used in a process wherein the addition of moisture is necessary to achieve adhesiveness to form the pellets or range blocks, difficulties are often encountered. For example, a typical process of making range blocks and various feed ingredients consists of placing the constituents into a ribbon or paddle-type mixer, wherein a quantity of water or steam or liquid molasses are added. The contents of the mixer are mixed and then conveyed to a block machine where the range blocks are produced. Since the mixture consists of different ingredients which differ in their physical properties, it is difficult to achieve a uniform moisture distribution which is of primary importance for making high quality blocks. Dried molasses products are highly hygroscopic and are capable of absorbing large quantities of water and prevent the same from being absorbed by the particles of the other ingredients until a full saturation is achieved. The resulting product is of inferior quality when a mixture having a non-homogeneous moisture content is used.

U.S. Letters Pats. Nos. 2,197,319 and 2,912,331 describe practices of drying cane molasses on a vegetable-type carrier such as corn and germ meal, soybean residue, etc. The processes described in the above identified patents do not lend themselves to tthe production of a suitable feed block. According to this invention, liquid cane molasses is dried on a carrier of non-absorbent materials, such as crystal salt (NaCl), dicalcium phosphate, limestone, difluorinated phosphate, sodium phosphate, monocalcium phosphate, oyster shells, etc. or on a mixture of them with absorbent materials. The invention described herein makes it possible to incorporate higher concentrations of molasses in the formulation of feed blocks according to the nutritional requirements thereof.

The method of this invention may be broadly defined as being comprised of the following steps:

(1) Mixing dry ingredients with liquid molasses.
(2) Drying mixture.
(3) Optional step of adding minor ingredients if desired.
(4) Mixing if step (3) is completed.
(5) Introduce mixture into mixer.—(a) Treat mixture with surface active emulsion; (b) Condition mixture with steam; (c) Add liquid binder if desired.
(6) Weigh mixture if desired.
(7) Place mixture into block machine.

The dry ingredients of step (1) are preferably comprised of non-absorbent materials such as phosphates (dicalcium phosphate, difluorinated phosphate, sodium phosphate, monocalcium phosphate), limestone, crystal salt (NaCl), oyster shells, etc. or a mixture of the above with absorbent materials such as vermiculite, etc. Other dry ingredients which may be included in step (1) are trace mineral mixtures, soybean hulls, corn germ meal, corn gluten meal, corn cobs, rice hulls, oat hulls, alfalfa, flax by-products, cotton seed meal, soybean meal, phenothiozine premix mixtures. Preferably, the molasses of step (1) is comprised of cane molasses having a preferred sugar content of 48–65% with 50% sugar being the best percentage and a preferred solid content of 68–90% with 70% solid content being the best percentage. The cane molasses may be substituted with beet molasses, citrus molasses, corn molasses (hydrol), wood molasses, etc. Tables I, II, III, IV and V below illustrate various formulations which have been used in step (1) above.

TABLE I

| | Parts by wt. |
|---|---|
| Liquid cane molasses (50% sugar, 70% solid) | 57 |
| Dicalcium phosphate | 16 |
| Limestone, ground | 10 |
| Vermiculate | 10 |
| Salt (NaCl) | 25 |

TABLE II

| | Parts by wt. |
|---|---|
| Liquid cane molasses (50% sugar, 70% solid) | 62 |
| Dicalcium phosphate | 18.6 |
| Limestone | 1.7 |
| Salt (NaCl) | 14.9 |
| Trace mineral mixture | .85 |
| Soybean hulls or corn germ meal | 18.6 |

TABLE III

| | Parts by wt. |
|---|---|
| Liquid cane molasses (50% sugar, 70% solid) | 62 |
| Soybean hulls | 18.6 |
| Dicalcium phosphate | 19.8 |
| Salt (NaCl) | 14.9 |
| Limestone (ground) | 1.7 |
| Trace mineral premix | 1.7 |

TABLE IV

| | Parts by wt. |
|---|---|
| Liquid cane molasses (50% sugar, 70% solid) | 45.0 |
| Trace mineral salt (NaCl with trace minerals) | 10.0 |
| Dicalcium phosphate | 20.0 |
| Limestone (ground) | 5.0 |
| Soybean meal | 27.5 |
| Cotton seed meal | 5.0 |

TABLE V

| | Parts by wt. |
|---|---|
| Liquid cane molasses (50% sugar, 70% solid) | 36 |
| Soybean hulls | 16 |
| Salt (NaCl) | 50 |
| Phenothiazine premix (26.5% phenothiazine) | 9 |

Steps (1) and (2) are preferably accomplished by (a) measuring by weight a predetermined quantity of liquid cane molasses (if used); (b) dilute the same to approximately 50% solid; (c) heat the diluted molasses to approximately 140 degrees Fahrenheit preferably through the use of direct steam; (d) add the heated molasses to the remainder of the ingredients such as illustrated in Tables I, II, III, IV and V which were previously placed in a conventional ribbon or paddle mixer; (e) the mixture is agitated for 5–15 minutes or until sufficiently mixed; (f) transfer the wet agitated mixture to a conventional reaction tank where it is maintained for approximately 15–60 minutes, preferably 30 minutes; and (h) transfer the mixture from the reaction tank to a conventional rotary drier where it is dried to preferably contain moisture in a range of 10–30%. The resulting product, after being cooled, consists of free flowing agglomerated granules or "crumbles" of irregular shape and in various dimensions in the range of 0.1–5.0 mm. These agglomerated granules or "crumbles" are comprised of the undissolved particles of the mixture, which are saturated and covered with a film of dried molasses. The physical characteristics of these granules makes the product well suited for making feed blocks, however, the product could be used for feeding in meal form also.

Optional steps (3) and (4) consist of adding minor ingredients such as vitamins, antibiotics, drugs or other additives to the granules and mixing for approximately five minutes or until the mixture is sufficiently mixed.

The mixture consisting of the granules or "crumbles" is then introduced into a conventional conditioner or high speed mixer which is preferably equipped with nozzles connected to three lines for delivery of certain liquid materials thereinto. A predetermined amount of liquid surface active emulsion is then added to the mixer or conditioner. The amount of liquid surface active emulsion to be added necessarily depends on the products being treated and can be readily determined through experimentation. A preferred surface active emulsion formulation is listed below in Table C.

TABLE C

| Ingredient | Amount by percent | |
|---|---|---|
| | Permissible range | Preferred |
| Propylene glycol | 10–99 | 35 |
| Lecithin | 1–90 | 50 |
| Vegetable or mineral oil | 0–65 | 12 |
| Antioxidant | 0–2 | 2 |
| Other surface active agents | 0–5 | 1 |

The antioxidant may be comprised of butylated hydroxy toluene if desired. Those ingredients listed under other surface active agents may consist of polyoxyethylene sorbitan monooleate or partial esters of the common fatty acids and are added to form a definite balance between the hydrophile and lipophile groups of the emulsion. The propylene glycol is added to the emulsion as a solvent for the molasses, lecithin and oils. The vegetable or mineral oils are added for conditioning of the molasses products. An emulsion of the general type disclosed herein is disclosed in U.S. Letters Pat. No. 2,967,106 although certain ingredients included herein are not disclosed therein.

A measured flow of live steam is then introduced into the mixer or conditioner to activate the adhesive properties of the dried molasses. The amount of steam required is easily obtained through experimentation and will effect the dimensions of the feed block, for example, more steam will result in a softer block having smaller dimensions.

Liquid binder is then added to the mixer or conditioner if desired. The liquid binder may be comprised of any of the common liquid binders such as liquid cane molasses, corn molasses, corn steep liquor, etc. By varying the amounts of steam or liquid binder it is possible to control the degrees of adhesion of the mixture in a wide range. The conditioned mixture is then conveyed into a suitable weighing apparatus such as a scale hopper and then deposited into the chamber of a conventional feed block machine where it is compressed to form the feed blocks.

The addition of the liquid surface active emulsion reduces the surface tension of the particles of the material and makes it possible to moisten the particles without making lumps. The condensate of the steam adds the necessary moisture at a controlled rate from a fraction of one percent to several percents by weight, depending on the requirement. The heat supplied with the steam in step (5) will cause the temperature of the material to rise from a few degrees to 140 degrees Fahrenheit which may be regulated by using conventional methods. Thus by controlling the flow of steam, the product is conditioned to the desired content of moisture and temperature. When lesser amounts of steam are used, the texture of the blocks will be soft. Any additional amount of steam, or an increase of moisture or temperature of the steam will increase the hardness of the blocks. Thus, this invention makes it possible to regulate the texture of the blocks in a much wider range compared to the conventional methods of making range blocks.

By employing the above described method of mixing the mineral and vegetable type constituents with cane molasses and then drying them in a rotary dried thereby forming a film of candy-like dry cane molasses on the surface thereof, thence by treating it with a surface active emulsion, thence by conditioning it with live steam and liquid binder, it is possible to regulate the hardness of the range blocks in a wide range without changing the pressure of the block machine during the formation of the blocks. The regulation of the hardness of the range blocks makes it possible to control the daily consumption of them in accordance with the nutritional requirements of the animals. Thus it can be seen that this invention not only describes a method of treating and processing feed ingredients but also describes a method of preparing feed blocks prepared from such materials. Thus the invention accomplishes at least all of its stated objectives.

Some changes may be made in the construction and arrangement of my Method of Manufacturing Feed Blocks without departing from the real spirit and purpose of my invention, and it is my intention to cover by my claims, any modified forms of structure or use of mechanical equivalents which may be reasonably included within their scope.

I claim:

1. The method of making an animal feed, comprising the following steps:
    mixing a predetermined quantity of molasses with a predetermined quantity of a non-absorbent carrier material,
    drying the mixture to a predetermined moisture content,
    introducing said dried mixture into a mixer,
    adding a predetermined quantity of a surface active emulsion to said dried mixture to reduce the surface tension of the dried mixture,
    mixing said emulsion and mixture for a predetemined time,
    thence introducing a predetermined amount of steam into said mixer to activate the adhesive properties of the molasses,
    then passing the mixture to a block machine and forming the same into feed blocks of predetermined hardness.

2. The method of claim 1 wherein an absorbent material is mixed with said non-absorbent carrier material.

3. The method of claim 2 wherein said absorbent material is comprised of a vermiculite material.

4. The method of claim 1 wherein said non-absorbent carrier material is comprised of at least one of dicalcium phosphate, difluorinated phosphate, sodium phosphate, monocalcium phosphate, limestone, crystal salt, and oyster shells.

5. The method of claim 1 wherein said molasses is comprised of a liquid molasses.

6. The method of claim 5 wherein the liquid molasses is a cane molasses having a sugar content of 48 to 65 percent and a solid content of 68 to 90 percent.

7. The method of claim 1 wherein the dried mixture is introduced into a mixer and a surface active emulsion is mixed therewith, said surface active emulsion comprising 10 to 99% propylene glycol and 1 to 90% lecithin.

8. The method of claim 7 wherein said surface active emulsion contains a predetermined quantity of a vegetable oil, and a predetermined quantity of an antioxidant.

References Cited

UNITED STATES PATENTS

| | | | | |
|---|---|---|---|---|
| Re. 25,337 | 2/1963 | Turner et al. | | 99—6 |
| 1,497,461 | 6/1924 | Oliver | | 99—6 |
| 2,843,492 | 7/1958 | Bart et al. | | 99—6 |
| 2,947,632 | 9/1960 | Kruse | | 99—6 |
| 2,967,106 | 1/1961 | Kviesitis | | 99—6 |
| 3,130,054 | 4/1964 | Parker | | 99—2 |
| 3,246,336 | 4/1966 | Baribo et al. | | 99—6 |
| 3,278,309 | 10/1966 | Heap et al. | | 99—6 |

LIONEL M. SHAPIRO, Primary Examiner

R. M. ELLIOTT, Assistant Examiner